(12) United States Patent
Yachide

(10) Patent No.: US 12,039,311 B2
(45) Date of Patent: Jul. 16, 2024

(54) MANAGING INSTALLATION OF VEHICLE APPLICATIONS USING WEIGHT VALUES

(71) Applicant: WOVEN BY TOYOTA, INC., Tokyo (JP)

(72) Inventor: Yusuke Yachide, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 208 days.

(21) Appl. No.: 17/706,053

(22) Filed: Mar. 28, 2022

(65) Prior Publication Data
US 2023/0305826 A1    Sep. 28, 2023

(51) Int. Cl.
G06F 9/445    (2018.01)
G06F 8/61    (2018.01)
H04L 12/26    (2006.01)

(52) U.S. Cl.
CPC ...................................... *G06F 8/61* (2013.01)

(58) Field of Classification Search
CPC .......... G06F 8/61; G06F 8/453; G06F 9/3836; G06F 11/3438; B60R 16/0231; H04L 67/535
See application file for complete search history.

(56) References Cited

U.S. PATENT DOCUMENTS

| | | | |
|---|---|---|---|
| 8,782,635 B2 | 7/2014 | Burke et al. | |
| 2012/0258696 A1 | 10/2012 | Nam et al. | |
| 2013/0124009 A1* | 5/2013 | Esler | H04L 67/303 701/1 |
| 2017/0193059 A1* | 7/2017 | Glover | G06F 16/248 |
| 2018/0300123 A1 | 10/2018 | Willis et al. | |
| 2019/0278581 A1 | 9/2019 | Miller et al. | |
| 2019/0299783 A1 | 10/2019 | Aminev | |
| 2019/0327131 A1 | 10/2019 | Conn | |

OTHER PUBLICATIONS

Cao et al., "Mining smartphone date for app usage prediction and recommendations: A survey", Pervasive and Mobile Computing, 2017, vol. 37, pp. 1-22 (22 pages total).

\* cited by examiner

*Primary Examiner* — S. Sough
*Assistant Examiner* — Mohammad H Kabir
(74) *Attorney, Agent, or Firm* — Sughrue Mion, PLLC

(57) ABSTRACT

An apparatus and system for vehicle application management. The apparatus includes: at least one storage storing instructions; and at least one processor configured to execute the instructions to perform operations including: obtaining information identifying a first plurality of vehicle applications selected by a user of the vehicle and determining, for the user, a user-specific application matrix comprising first weight values. Each one of the first weight values is for a respective one of the first plurality of vehicle applications, and each one of the first weight values is determined based on at least a frequency of use, by the user, of the respective one of the first plurality of vehicle applications. The operations also include controlling, using the determined user-specific application matrix, downloading and installation, at the vehicle, of at least one of the first plurality of vehicle applications that is not currently installed in the vehicle.

24 Claims, 4 Drawing Sheets

MANAGING INSTALLATION OF VEHICLE APPLICATIONS USING WEIGHT VALUES

BACKGROUND

1. Technical Field

Non-limiting embodiments of the disclosure relate to managing vehicle applications installed in a vehicle, and in particular, to an apparatus, a server and a non-transitory computer readable storage medium storing instructions for selecting and installing, in advance, those vehicle applications that a user is most likely to use.

2. Description of Related Art

As the functionality within vehicles continues to diversify and evolve, so too have the number of software vehicle applications executable by the vehicle and available to a driver or an occupant of the vehicle. The number of available vehicle applications, however, may exceed the storage capacity or the allocated storage space for vehicle applications within a vehicle. Thus, it is possible that not every application developed for a vehicle is installed in the vehicle. Instead, a user of the vehicle may select one or more desired vehicle applications from among those that are available, and the selected vehicle applications may be downloaded and installed in the vehicle via an Over-the-Air ("OTA") update, for example.

However, the vehicle applications used by individual users of a vehicle may differ for a wide variety of reasons. For example, a driver of the vehicle may use vehicle applications that may differ from those that a passenger of the vehicle uses. Or, if a car is used by multiple users, e.g., within a family, via a car sharing or rental service, a commercial fleet, a bus, a taxi etc., then the vehicle applications desired or used by one user of the car may differ from those of another.

Thus, each time a different user uses the vehicle, the corresponding vehicle applications selected by that user that are not currently installed in the vehicle must be downloaded and installed via an OTA update. For example, a first user may pre-configure or select vehicle applications A, B, C, and D to be installed in the vehicle, and a second user may pre-configure or select vehicle applications D, E, F, and G to be installed in the vehicle. When the second user uses or operates the vehicle after the first user has used the vehicle, the vehicle may update its software configuration by deleting vehicle applications A, B, and C, and downloading and installing vehicle applications E, F, and G. This results in a large amount of data transmission overhead, inefficient use of application data storage in the vehicle, and increased time for downloading and installation, each time a different user uses the vehicle.

In a related art vehicle software management system, a server stores all software configuration information for each user and for each vehicle. That is, the software management is handled entirely on the server side, resulting in a large processing load on the server. Further, because the server stores the configuration information for each user, a user's personal information must be provided to the server and this may be undesirable for users.

Illustrative, non-limiting embodiments of the present disclosure address the above disadvantages and other disadvantages not described above. Also, the present invention is not required to overcome the disadvantages described above, and an illustrative, non-limiting embodiment of the present invention may not overcome any of the problems described above.

SUMMARY

The present disclosure provides an apparatus, a server, and a non-transitory computer readable storage medium storing instructions for managing vehicle applications installed in a vehicle using an application matrix including weight values for each of the vehicle applications, wherein each one of the weight values is based on a frequency of use of a respective vehicle application. A non-limiting embodiment employs a user-specific application matrix determined based on usage of a specific vehicle user. A non-limiting embodiment employs a group application matrix determined based on usages among a group of different vehicle users.

Apparatuses and methods consistent with the inventive concept(s) provide a vehicle software management system that predicts and pre-installs the application software that a user is likely to use or desire in the vehicle, based on an application usage history for a specific user and/or for a predetermined group of users. To this end, vehicle applications are given weight values based on their frequency of use according to application usage history. Those vehicle applications that are most frequently used by the user, or by a comparable group of users, are predicted to be selected or used by a new user, and are downloaded and installed in the vehicle in advance. This, among other advantages, reduces the number of vehicle applications that must be rewritten, reduces the amount of data that must be transmitted for OTA updates and the costs thereof, reduces server costs, and reduces download and installation time, each instance where a different user uses the vehicle. A non-limiting embodiment also addresses the issue of a vehicle's limited storage capacity, or allocated storage space, for vehicle applications and improves efficiency of writing to storage at the vehicle.

An aspect of the present disclosure provides an apparatus for a vehicle. The apparatus comprises: at least one storage storing instructions; and at least one processor. The at least one processor is configured to execute the instructions to perform operations comprising: obtaining information identifying a first plurality of vehicle applications selected by a user of the vehicle and determining, for the user, a user-specific application matrix comprising first weight values. Each one of the first weight values is for a respective one of the first plurality of vehicle applications. Each one of the first weight values is determined based on a frequency of use, by the user, of the respective one of the first plurality of vehicle applications. The operations further comprise controlling, using the determined user-specific application matrix, downloading and installation, at the vehicle, of at least one of the first plurality of vehicle applications that is not currently installed in the vehicle. The operations may further comprise providing the determined user-specific application matrix to a server.

According to another aspect, the operations may further comprise: controlling receiving, at the vehicle, from a server, a group application matrix comprising second weight values. Each one of the second weight values is for a respective one of a second plurality of vehicle applications. Each one of the second weight values is based on a frequency of use of the respective one of the second plurality of vehicle applications by a plurality of respective vehicle users. The operations may further comprise controlling, using the group application matrix, downloading and installation, at the vehicle, of at least one of the second plurality vehicle applications that is not currently installed in the vehicle.

Another aspect provides a vehicle application management server comprising: at least one storage storing instructions; and at least one processor configured to execute the instructions to perform operations comprising: receiving, from a vehicle, information about a user-specific application matrix for a user. The user-specific application matrix comprises first weight values, each one of the first weight values is for a respective one of a first plurality of vehicle applications selected by the user, and each one of the first weight values is determined based on a frequency of use, by the user, of the respective one of the first plurality of vehicle applications. The operations further comprise updating second weight values of a group application matrix stored in the at least one storage based on the first weight values of the user-specific application matrix. Each one of the second weight values is for a respective one of a second plurality of vehicle applications. Each one of the second weight values is based on a frequency of use of the respective one of the second plurality of vehicle applications by a plurality of respective vehicle users. The operations further comprise transmitting the updated group application matrix to the vehicle and receiving, from the vehicle, a request to download and install, at the vehicle, at least one of the second plurality vehicle applications, selected from the updated group application matrix, that is not currently installed in the vehicle.

Another aspect of the present disclosure provides a non-transitory computer readable storage medium storing instructions which, if executed, cause a processor of a vehicle to execute operations comprising: obtaining information identifying a first plurality of vehicle applications selected by a user of the vehicle; and determining, for the user, a user-specific application matrix comprising first weight values. Each one of the first weight values is for a respective one of the first plurality of vehicle applications. Each one of the first weight values is determined based on a frequency of use, by the user, of the respective one of the first plurality of vehicle applications. The operations further comprise controlling, using the determined user-specific application matrix, downloading and installation, at the vehicle, of at least one of the first plurality of vehicle applications that is not currently installed in the vehicle.

Another aspect provides an apparatus for a vehicle, the apparatus comprising: at least one storage storing instructions; and at least one processor configured to execute the instructions to perform operations. The operations comprise controlling receiving, at the vehicle, from a server, a group application matrix comprising second weight values. Each one of the second weight values is for a respective one of a second plurality of vehicle applications. Each one of the second weight values is based on a frequency of use of the respective one of the second plurality of vehicle applications by a plurality of respective vehicle users. The operations further comprise controlling, using the group application matrix, downloading and installation, at the vehicle, of at least one of the second plurality vehicle applications that is not currently installed in the vehicle.

BRIEF DESCRIPTION OF THE DRAWINGS

Features, advantages, and technical and industrial significance of non-limiting embodiments of the disclosure will be described below with reference to the accompanying drawings, in which like signs denote like elements, and wherein.

DETAILED DESCRIPTION OF ILLUSTRATIVE, NON-LIMITING EMBODIMENTS

Figure 1:
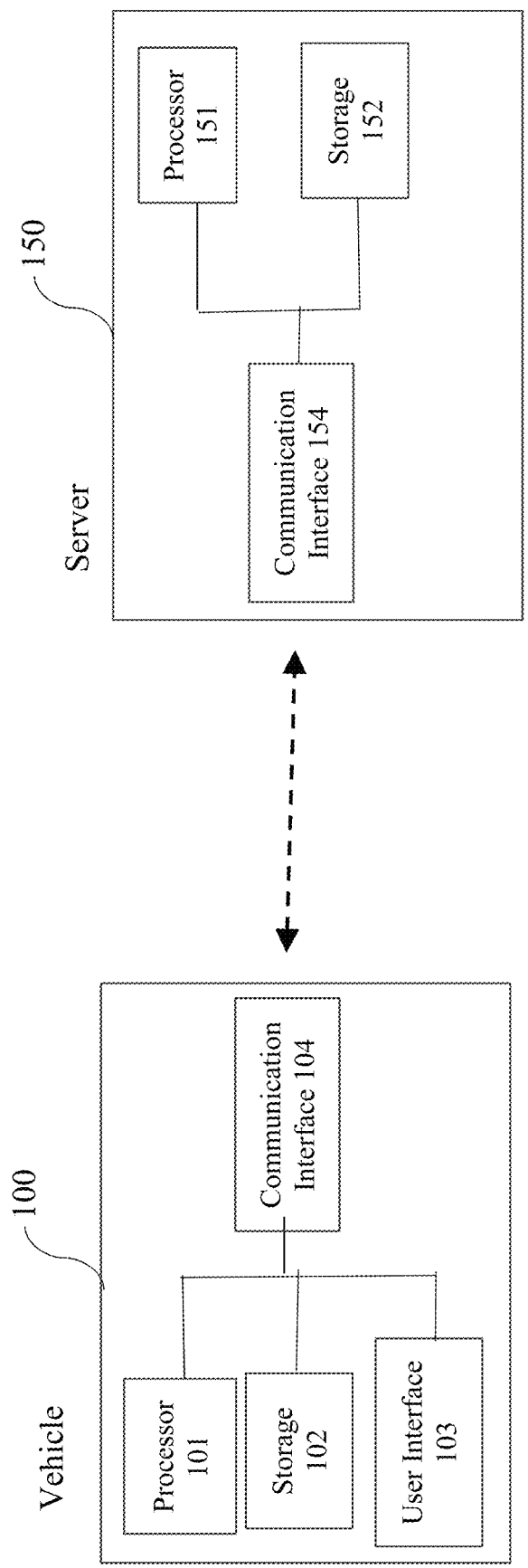
FIG. 1 is a block diagram illustrating a configuration of a vehicle application management system according to a non-limiting embodiment.

Non-limiting embodiments of the disclosure will be described in detail with reference to the accompanying drawings. The same reference numerals used in the drawings may identify the same or similar elements. The terms used in the disclosure should not be strictly construed as defined in the disclosure, but should be construed as those one of ordinary skilled in the art would understand in the context of the disclosure. It should be noted that the non-limiting embodiments of the disclosure may be in different forms and are not limited to the embodiments of the disclosure set forth herein.

FIG. 1 is a block diagram illustrating a configuration of a vehicle application management system comprising a vehicle 100 and a server 150 according to a non-limiting embodiment. It is understood, however, that other embodiments may not be limited to the specific configuration shown in FIG. 1. As one non-limiting example, a user device may be employed that is separate from the vehicle 100.

According to a non-limiting embodiment, the vehicle 100 may be used by any number of users who share the vehicle 100, such as a private car owned by a family, where the vehicle application usage of each family member may differ. According to another non-limiting embodiment, the vehicle 100 may be a publicly accessible car-sharing vehicle used by an unspecified number of users, where the identity and vehicle application preferences of the next user are not necessarily known, but time may be required to initially prepare, download and install the vehicle applications for the vehicle 100 for use by the next user. According to yet another non-limiting embodiment, the vehicle 100 may be a commercial vehicle such as a bus, limo, taxi, or the like, where, in addition to custom vehicle application preferences for each user, there may also be vehicle application customization that arises from operations of the commercial vehicle, such as routes, operating times, conditions, etc.

As shown in FIG. 1, the vehicle 100 may comprise at least one processor 101, a storage 102, a user interface 103 and a communication interface 104. The at least one processor 101 may be connected to, and configured to control, the operations of the storage 102. The at least one processor 101 may be configured to, among other things, execute instructions that are stored in the storage 102 to perform various operations.

The at least one processor 101 may be implemented according to various embodiments. For example, the at least one processor 101 may be implemented as at least one of an application specific integrated circuit (ASIC), an embedded processor, a microprocessor, hardware control logic, a hardware finite state machine (FSM), a digital signal processor (DSP), a neural network processor, or the like. The at least one processor 101 may include a central processing unit (CPU), a graphic processing unit (GPU), and a main processing unit (MPU), or the like. In addition, the at least one processor 101 may include one or more processors.

According to a non-limiting embodiment, the storage 102 may store at least one instruction and various software programs or vehicle applications that are currently installed for use in the vehicle 100. For example, the storage 102 may include a semiconductor memory, such as a flash memory, a magnetic storage medium such as a hard disk, or the like. The storage 102 may refer to any volatile or non-volatile memory, a read-only memory (ROM), a random access memory (RAM) communicatively coupled to the at least one processor 101 or a memory card (e.g., a micro SD card, a memory stick) connectable to the vehicle 100. The storage 102 may store various software modules or codes for operating the vehicle 100, and the at least one processor 101 may control the operations of the vehicle 100 by executing various software modules that are stored in the storage 102. The storage 102 may be accessed by the at least one processor 101 to perform data reading, recording, modifying, deleting, updating or the like. Further, the storage 102 may store executable instructions, code, data objects etc.

According to a non-limiting embodiment, the user interface 103 is configured to receive input from, and provide information to, a user of the vehicle 100 or other devices. The at least one processor 101 may receive a user command for controlling the operations of the vehicle 100 through the user interface 103.

The user interface 103 may be any computing device and may be installed in, or may be a device that is separate from, the vehicle 100. The user interface 103 may be, for example, an input terminal of the vehicle 100, a touch screen display of the vehicle 100, a mobile phone, a mobile terminal, a tablet, a laptop computer, a desktop computer, a smart appliance, a television, a smart wearable device, etc. The user interface 103 may include at least one processor, a memory, a display, an input device, and a communication unit. The display and input device may be integrated, e.g., as a touch screen display. The user interface 103 may be provided through a dedicated application in the vehicle 100 (e.g., an application for configuring the vehicle) or through a web page accessible via an Internet browser.

The user interface 103 may include a display, such as a liquid crystal display (LCD) panel, organic light emitting diodes (OLED), a flexible display, a touch screen display, a transparent display, or the like. The at least one processor 101 may control the user interface 103 to display image signals received from the storage 102 of the vehicle 100 or received from an external device through the communication interface 104. The user interface 103 may comprise a wide variety of input hardware including, but not limited to, a voice interface, a microphone, a camera, a remote control, screen menus, icons, a keyboard, buttons, dials, a mouse, or the like. However, the implementation of the user interface 103 is not limited to the aforementioned embodiments.

The user interface 103 allows the user to (among other things) select one or more vehicle applications to be installed in the vehicle 100 when the user uses the vehicle 100. Based on receiving a selection of the one or more vehicle applications from the user, the user interface 103 controls transmission of information identifying the selected application(s) to the at least one processor 101 of the vehicle 100. The transmission may be a direct transmission (e.g., peer-to-peer transmission) via a direct wireless or wired communication method (e.g., Bluetooth, WiFi direct, NFC, USB, etc.), or may be via a network (e.g., a local area network, a wireless local area network) or one or more intervening devices (e.g., an Access Point, server, etc.).

The communication interface 104 may include circuitry or an interface that is configured to communicate with an external device, such as the server 150, through a network. The communication interface 104 may include at least one of a Wi-Fi module, a Bluetooth module, a wireless communication module, or a near field communication (NFC) module. Specifically, the Wi-Fi module may communicate by a Wi-Fi method and the Bluetooth module may communicate by a Bluetooth method. When using the Wi-Fi module or the Bluetooth module, various connection information such as service set identifier (SSID) may be transmitted and received for communication connection and then various information may be transmitted and received through the communication interface 104.

The communication interface 104 can receive information from the user interface 103 regarding vehicle applications that have been selected by the user. The at least one processor 101 may be configured to compare the information regarding vehicle applications that have been selected by the user, with the vehicle applications currently installed in the vehicle 100 and determine which ones of the vehicle applications that have been selected by the user are not currently installed in the vehicle 100 (e.g., a delta application list). The communication interface 104 can request and download the one or more vehicle applications that have been selected by the user to be installed in the vehicle 100 for example, via an OTA update from the server 150.

According to a non-limiting embodiment, the at least one processor 101 may determine a user-specific application matrix for a user. The user-specific application matrix includes a list of vehicle applications and, for each vehicle application, a respective factor or weight value corresponding to a user's frequency of use for that respective vehicle application. According to a non-limiting embodiment, the weight values may be between 0.0 and 1.0, but this is merely one non-limiting example. For instance, the user-specific application matrix for a user k(1), and a set of vehicle applications (App1, App2, App3) selected by the user k(1), may comprise (0.6, 0.2, 0.5) as weight values based on that user's frequency of use of each vehicle application.

The user-specific application matrix may be transmitted from the vehicle 100 to the server 150 at any time, such as once the user stops operating the vehicle 100 (i.e., upon turning off the engine of the vehicle, or based on the vehicle being turned on a next time), based on the occurrence of a predetermined event, or periodically. Further, the user-specific application matrix may be generated or updated based on a usage history over a predetermined period by a particular user (e.g., a specific user's use of the vehicle 100 within a predetermined time period, such as one day or one week, or a specific user's use of the vehicle from one instance of starting the vehicle to stopping the vehicle, etc.). The user-specific application matrix may be stored in at least one of the vehicle 100 and the server 150, or may be newly-generated for each use of the vehicle 100.

The server 150 may receive user-specific application matrices from a plurality of vehicles, including the vehicle 100, and may update a group application matrix stored at the server 150 based on the user-specific application matrices received. The group application matrix is an application matrix that includes weight values for each of plural vehicle applications. The weight values in the group application matrix are determined based on the frequency of uses of the applications as indicated by the received user-specific application matrices. The server 150 may update the group application matrix based on user-specific application matrices received from a particular group of vehicles, which may be comparable to the vehicle 100. The server 150 then transmits the updated group application matrix to the vehicle 100 and, if desired, a plurality of vehicles. According to a non-limiting embodiment, the server 150 may be configured such that the server 150 stores only minimal configuration information about individual users.

The plurality of vehicles to which the server 150 transmits the updated group application matrix may be the same as or different from the particular group of vehicles from which the group application matrix was determined. The group of vehicles may correspond to a group of vehicles within a predetermined region (e.g., city, county, prefecture, province, state, country, continent, etc.), or a predetermined group of people (e.g., a family, a company, or a pre-selected group of individuals).

It is understood that, according to non-limiting embodiments, the server 150 may include one or more servers, and the operations of the server 150 may be performed in a single server or distributed across plural servers.

The at least one processor 101 of the vehicle 100 may be configured to identify the vehicle applications that a new user of the vehicle is predicted to select or use based on the group application matrix received from the server 150. For example, the at least one processor 101 may identify a predetermined number of vehicle applications with higher weight values in the group application matrix (e.g., the six applications with the highest weight values), vehicle applications with weight values that exceed a predetermined threshold value, or a predetermined number of vehicle applications that exceed the predetermined threshold value. The at least one processor 101 may also identify which vehicle applications will most nearly fill the storage capacity or allocated storage space for vehicle applications in the storage 102, prioritizing those vehicle applications with higher weight values in the group application matrix. The at least one processor 101 may then determine which of those identified applications are not currently installed, and request, download and install those not-installed applications via an OTA update.

For example, the below Table 1 shows a group application matrix at t(1) determined from a group of users k(1 . . . n) at a time (t1):

| USER | APPLICATION MATRIX |
| --- | --- |
| User k(1) | (App1(1.0), App2(0.5), App3(1.0), . . .) |
| User k(2) | (App1(1.0), App2(0.5), App3(1.0), . . .) |
| . . . | |
| User k(n) | (App1(1.0), App2(0.5), App3(1.0), . . .) |
| Group Application Matrix(t1) | (App1(1.0), App2(0.5), App3(1.0), . . .) |

The vehicle 100 may receive the Group Application Matrix(t1) from the server 150, and the at least one processor 101 may identify that vehicle applications App1 and App3 are the most likely to be selected by a new user based on the weight values or factors in the group application matrix. Accordingly, the at least one processor 101 may then determine which ones (if any) of vehicle applications App1 and App3 are not currently installed in the vehicle 100 and then request, download and install those not-installed applications via an OTA update, for example.

According to one non-limiting example, if a new user k(n+1) of the vehicle 100 subsequently selects vehicle applications App1, App2, and App4 (e.g., via the user interface 103), the at least one processor 101 may then determine that App4 is not currently installed and then request App4 from the server 150. App4 is then downloaded and installed in the vehicle 100 via an OTA update, for instance. As the new user k(n+1) uses the vehicle, a use for each of the vehicle applications is monitored by the at least one processor 101 and a frequency of use is determined by the at least one processor 101.

According to a non-limiting embodiment, the frequency of use may be determined by an external device (e.g., the server 150) based on information indicative of the use received from the vehicle 100, e.g., a usage history or log. The at least one processor 101 (or external device that determines the frequency of use of the vehicle applications) generates a user-specific application matrix based on the determined frequency of use. For example, the user-specific application matrix for user k(n+1) may be ((App1(1.0), App2(0.5), App3(0.0), App4(1.0) . . . ). Further, the at least one processor 101 (or external device that generates the user-specific application matrix) may transmit the user-specific application matrix to the server 150, so that the server 150 can update the group application matrix using the user-specific application matrix.

The vehicle 100 may transmit the user-specific application matrix to the server 150 at any time, or according to a predetermined schedule (e.g., periodically), or in response to a predetermined event (e.g., a user instruction to transmit the user-specific application matrix, or based on the use of the vehicle 100 ending, stopping of the engine, etc.). According to a non-limiting embodiment, the vehicle 100 may transmit the entire user-specific application matrix, or may transmit only a determined difference, or determined differences, between the user-specific application matrix and the group application matrix, rather than transmitting the entire user-specific application matrix, to thereby reduce data transmission.

The server 150 may then update the group application matrix based on the user-specific application matrix received from the vehicle 100. For example, the below Table 2 shows the updated group application matrix at a time t(2) in view of the user-specific application matrix of user k(n+1):

| USER | APPLICATION MATRIX |
| --- | --- |
| User k(1) | (App1(1.0), App2(0.5), App3(1.0), . . .) |
| User k(2) | (App1(1.0), App2(0.5), App3(1.0), . . .) |
| . . . | |
| User k(n) | (App1(1.0), App2(0.5), App3(1.0), . . .) |
| User k(n + 1) | (App1(1.0), App2(0.5), App3(0.0), App4(1.0) . . .) |
| Group Application Matrix(t2) | (App1(1.0), App2(0.5), App3(0.8), App4(0.2) . . .) |

After the server 150 updates the group application matrix based on the user-specific application matrix received from the vehicle 100, the server may then delete the user-specific application so that the user-specific application is not stored at the server 150 after such updating.

According to a non-limiting embodiment, the group application matrix may be determined using a filter to, for example, filter out only a predetermined number of newest user-specific application matrices, or to filter out user-specific application matrices corresponding to a predetermined period of time. For example, where the group application matrix is determined from a predetermined number of newest user-specific application matrices and the predetermined number is n, then the updated group application matrix at t(2) may be determined as shown below in Table 3:

| USER | APPLICATION MATRIX |
|---|---|
| User k(2) | (App1(1.0), App2(0.5), App3(1.0), . . .) |
| . . . | |
| User k(n) | (App1(1.0), App2(0.5), App3(1.0), . . .) |
| User k(n + 1) | (App1(1.0), App2(0.5), App3(0.0), App4(1.0) . . .) |
| Group Application Matrix(t2) | (App1(1.0), App2(0.5), App3(0.7), App4(0.3) . . .) |

However, it is understood that a wide variety of filter criteria may be used consistent with non-limiting embodiments. For example, although the updated group application matrix at t(2) shown in Table 3 is derived from a predetermined number of newest user-specific application matrices from different users (e.g., User k(2), User k(n) and User k(n+1)), the group application matrix may be updated based on a predetermined number of newest user-specific application matrices that are not each from different users. Indeed, according to a non-limiting embodiment, the predetermined number of newest user-specific application matrices may all be from the same user. Moreover, according to a non-limiting embodiment, the filter criteria may comprise weighted normalization. For instance, the group application matrix may be updated by weighting newer user-specific application matrices more heavily than older user-specific application matrices. Further, according to a non-limiting embodiment, the group application matrix may be updated using an average of all user-specific application matrices that have been received by the server 150.

Next, the server 150 transmits the updated group application matrix(t2) to the vehicle 100 and, optionally, to a plurality of vehicles. The server 150 may broadcast, multicast, or unicast the updated group application matrix at any time, such as in response to a predetermined event (e.g., a predetermined time interval, in response to a request from a vehicle, each time the matrix is updated, etc.).

The at least one processor 101 may again identify that applications App1 and App3 are the most likely to be selected by a new user based on the weight values or factors in the updated group application matrix at t(2). Accordingly, the at least one processor 101 may request, download and install the identified applications App1 and App3. For example, the at least one processor 101 may delete App4 and install App3, or the at least one processor 101 may download App3 and keep App4 if there is sufficient storage capacity.

According to another non-limiting embodiment, the at least one processor 101 may determine a vehicle-specific application matrix that is based on an application matrix determined from a usage history of applications by any user of the vehicle 100 and the group application matrix received from the server 150 (e.g., an average or weighted average of the two matrices).

According to another non-limiting embodiment, the at least one processor 101 may determine multiple user-specific application matrices for a single user, such as a user-specific application matrix for the user's typical weekday use and a second user-specific application matrix for the user's trip use.

In addition, according to a non-limiting embodiment, a method and an apparatus disclosed herein may be provided as software of a computer program product. A computer program product may be distributed in the form of a machine readable storage medium (e.g., compact disc read only memory (CD-ROM)) or distributed online through an application store or between two devices directly. In the case of on-line distribution, at least a portion of the computer program product (e.g., a downloadable app) may be stored temporarily or at least temporarily in a storage medium such as a manufacturer's server, a server in an application store, or a memory in a relay server.

Although some example components of the vehicle 100 are described above, it is understood that embodiments of the vehicle 100 are not limited thereto, and the vehicle 100 may include more or less components.

According to a non-limiting embodiment, the server 150 may be implemented by any piece of computer hardware or software that provides a service or functionality for the vehicle 100. The server 150 may a comprise communication interface 154, a processor 151 and a storage 152. The configuration of the communication interface 154, the processor 151, and the storage 152 may be implemented by non-limiting embodiments similar to the embodiments described above regarding the communication interface 104, the at least one processor 101 and the storage 102, respectively. However, embodiments of the communication interface 154, the processor 151, and the storage 152 are not limited thereto.

The communication interface 154 is configured to receive communications from, and transmit communications to, the communication interface 104. For example, the communication interface 154 may be configured to allow the communication interface 104 to download a wide variety of vehicle applications via an OTA update. Such vehicle applications may include any application for use in the vehicle 100.

Figure 2:
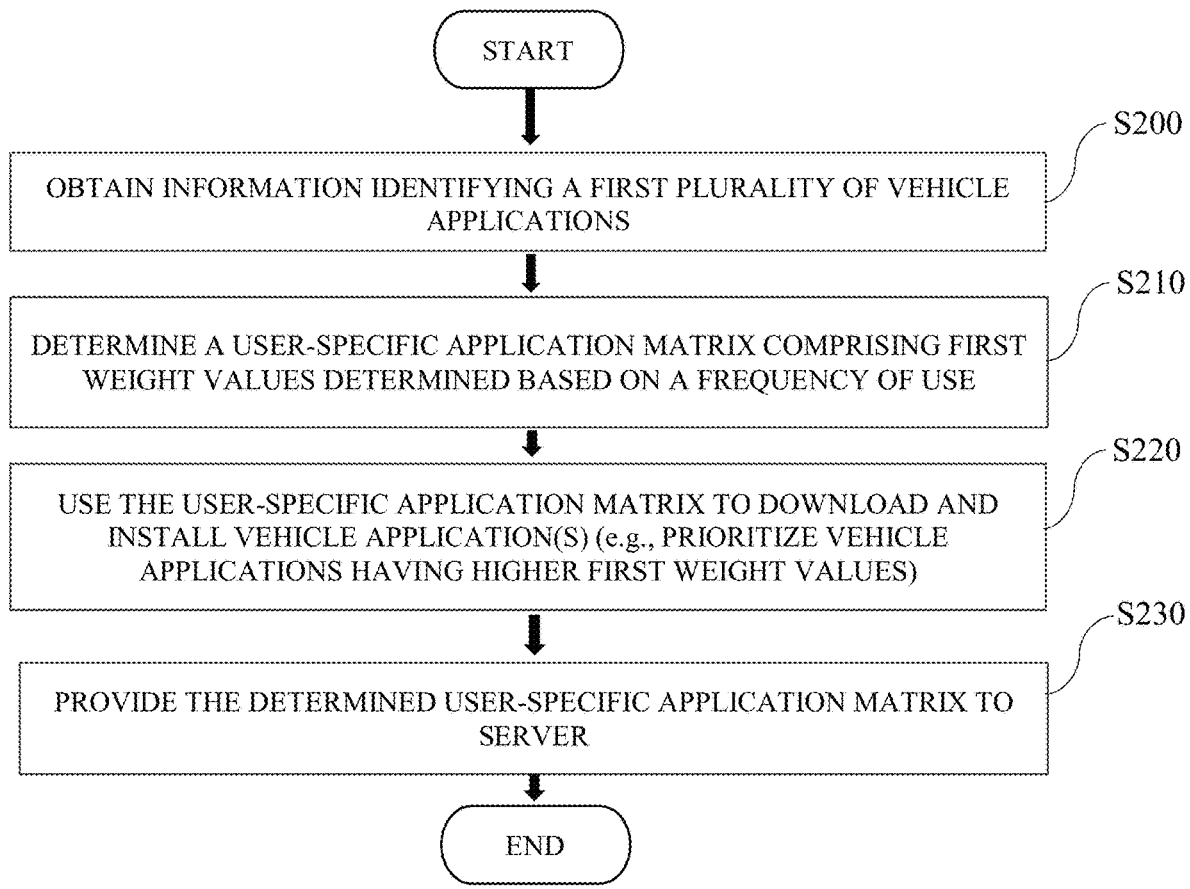
FIG. 2 is a sequence diagram showing operations of a vehicle application management system using a user-specific application matrix according to a non-limiting embodiment.

FIG. 2 is a flowchart illustrating operations of a vehicle application management system using a user-specific application matrix according to a non-limiting embodiment. It is understood that the order of steps illustrated in FIG. 2 is not limiting.

In operation S200, the at least one processor 101 of the vehicle 100 obtains information identifying a first plurality of vehicle applications that have been selected by a user of the vehicle 100. Such information may be identified by the at least one processor 101 based on past usage by the user of vehicle applications, or may be manually selected by the user via the user interface 103.

In operation S210, a user-specific application matrix is determined. The user-specific application matrix may comprise first weight values. Each one of the first weight values may be for a respective one of the first plurality of vehicle applications. Further, each one of the first weight values may be determined based on a frequency of use of the respective one of the first plurality of vehicle applications.

In operation S220, the user-specific application matrix is used to download and install, at the vehicle 100, at least one of the first plurality of vehicle applications that is not currently installed in the vehicle 100. The vehicle applications may be downloaded from the server 150. Further, the downloading and installation of one(s) of the first plurality of vehicle applications having higher first weight values (i.e., indicating higher frequency of use) may be prioritized over one(s) of the first plurality of vehicle applications having lower first weight values. Accordingly, the vehicle applications that are most frequently used by the user may be installed in the vehicle 100.

Optionally, according to a non-limiting embodiment, in operation S230, the determined user-specific application matrix may be provided from the vehicle 100 to the server 150. According to a non-limiting embodiment, only differences between the determined user-specific application matrix and a group application matrix received from the server 150, may be transmitted from the vehicle 100 to the server 150, rather than the entire user-specific application matrix.

The server 150 may update a group application matrix stored in the storage 152 using the determined user-specific application matrix provided from the vehicle 100 to the server 150. For instance, according to a non-limiting embodiment, if the stored group application matrix comprises (1.0, 0.7, 0.8, 0.3) and the determined user-specific application matrix comprises (1.0, 0.5, 1.0, NA) then the updated group application matrix may comprise (1.0, 0.6, 0.9, 0.3). According to a non-limiting embodiment, the server 150 may update a stored group application matrix with the determined user-specific application matrix provided from the vehicle 100 to the server 150 every time a new user uses the vehicle 100.

Figure 3:
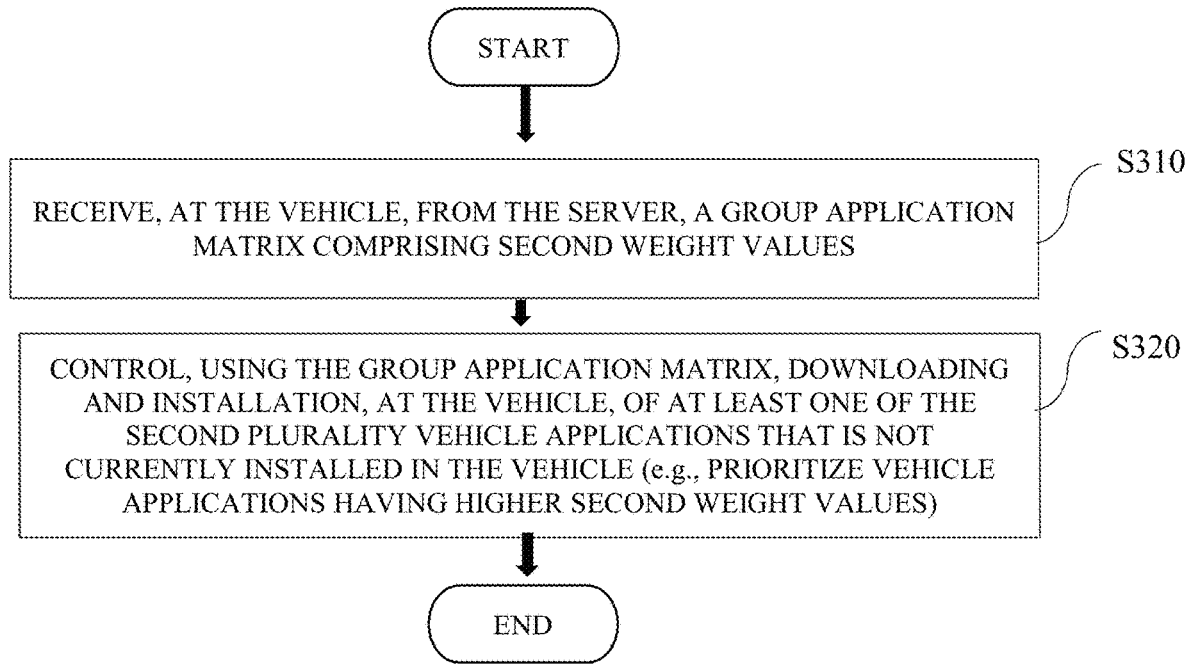
FIG. 3 is a sequence diagram showing operations of a vehicle application management system using a group application matrix according to a non-limiting embodiment.

In addition to, or as an alternative to, identifying the vehicle applications that a user is predicted to select or use based on the determined user-specific application matrix, the vehicle applications that a user is predicted to select or use may be identified using information from other vehicle users using a group application matrix. For instance, FIG. 3 is a flowchart illustrating operations of a vehicle application management system using a group application matrix according to a non-limiting embodiment. It is understood that the order of steps illustrated in FIG. 3 is not limiting.

In operation S310, the vehicle 100 receives, from the server 150, a group application matrix comprising second weight values. Each one of the second weight values is for a respective one of a second plurality of vehicle applications. Moreover, each one of the second weight values is based on a frequency of use of the respective one of the second plurality of vehicle applications by a plurality of respective vehicle users. According to a non-limiting embodiment, only differences between the updated group application matrix and the user-specific application matrix received from the vehicle 100, may be transmitted from the server 150 to the vehicle 100, rather than the entire group application matrix.

The plurality of respective vehicle users may include the user, or may not include the user. For example, the second weight values may be based on a frequency of use of the respective ones of the second plurality of vehicle applications by a plurality of respective vehicle users over a predetermined time period, from a particular geographic region, from a particular age group, or from any other demographic grouping. According to a non-limiting embodiment, the second weight values may be based on a frequency of use of the respective ones of the second plurality of vehicle applications by users of a same vehicle model or a same vehicle type as the vehicle 100.

According to a non-limiting embodiment, the group application matrix may reflect the average preferences for vehicle applications of all users within 5 km of the vehicle, preferences for vehicle applications used within the past day or two and/or preferences for vehicle applications on a corresponding day of the week/time.

According to a non-limiting embodiment, the second weight values may be based on a frequency of use of the respective ones of the second plurality of vehicle applications by members of a particular family who share use of the vehicle 100, or by members of a particular commercial entity who share use of the vehicle 100, such as a commercial bus or taxi service. Accordingly, the second weight values may be selected based on a wide variety of groupings of particular users to predict vehicle applications that the user is likely to use in the vehicle 100.

Operation S320 comprises controlling, using the group application matrix received from the server 150, downloading and installation, at the vehicle 100, of at least one of the second plurality vehicle applications that is not currently installed in the vehicle. Further, the downloading and installation of one(s) of the second plurality of vehicle applications having higher second weight values (i.e., indicating higher frequency of use) may be prioritized over other one(s) of the second plurality of vehicle applications having lower second weight values. Accordingly, the vehicle applications that are predicted to be most frequently used by the user (according to the higher second weight values) may be installed in the vehicle 100.

According to a non-limiting embodiment, an updated group application matrix may be provided by the server 150 to the vehicle 100, wherein the updated group application matrix has been updated using the determined user-specific application matrix that was provided to the server 150 from the vehicle.

According to a non-limiting embodiment, operations S200, S210 and S220 may be performed, whereas operations S230, S310 and S320 are not performed.

Alternatively, according to a non-limiting embodiment, operations S200, S210 and S220 are performed, but operations S230, S310 and S320 are only performed if there is available storage capacity for installing additional vehicle applications.

According to a non-limiting embodiment, operations S200, S210, S220 and S230 may not be performed and operations S310 and S320 are performed and, thus, only vehicle applications from the group application matrix may be installed.

Figure 4:
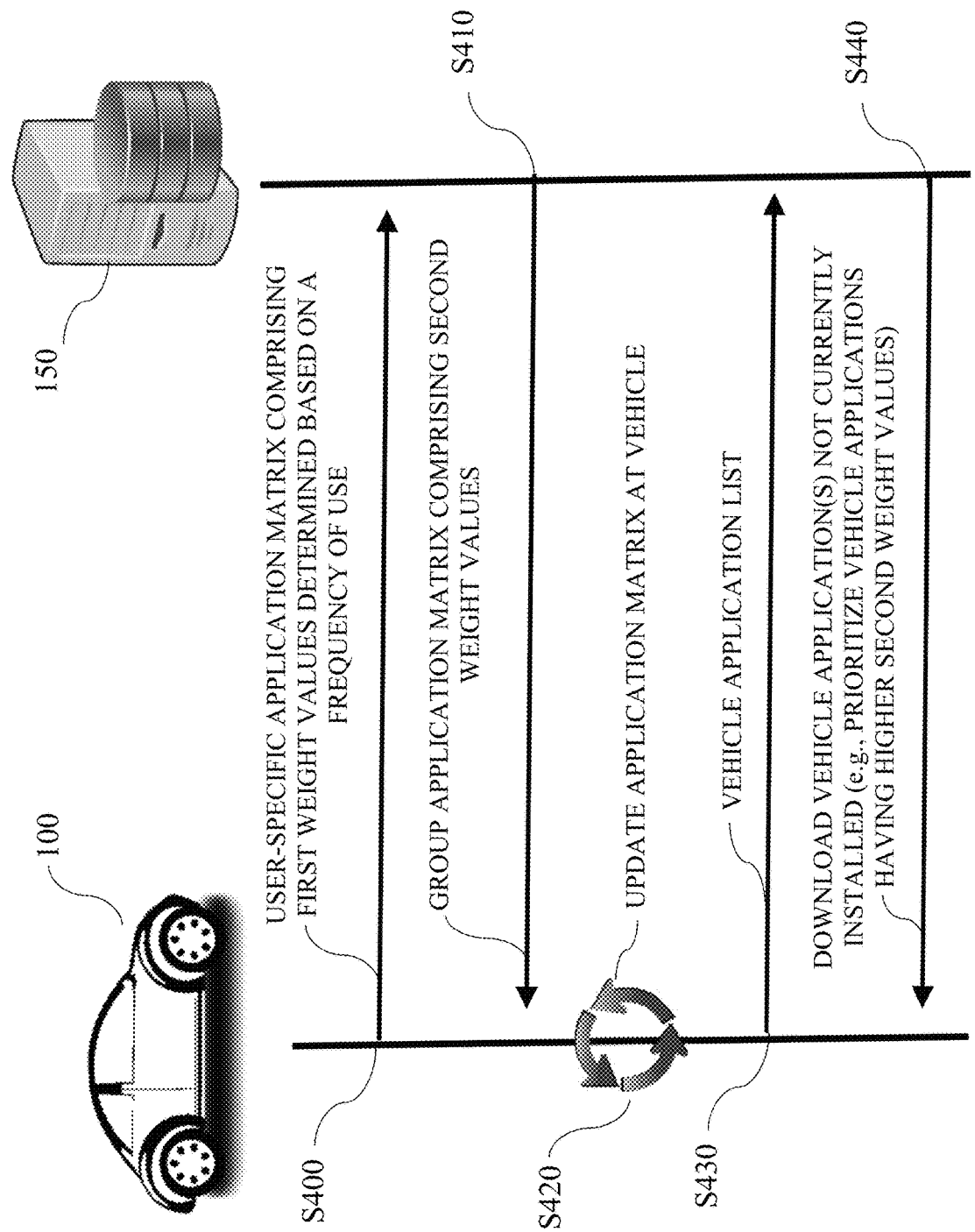
FIG. 4 is another sequence diagram showing operations of a vehicle application management system according to a non-limiting embodiment.

FIG. 4 is another sequence diagram showing operations of a vehicle application management system including the vehicle 100 and the server 150 according to a non-limiting embodiment. Although FIG. 4 shows operations occurring in a particular sequential order, the operations may occur in a wide variety of sequential orders consistent with non-limiting embodiments and some operation may not be performed at all consistent with non-limiting embodiments.

In operation S400, the vehicle 100 provides to the server 150 a user-specific application matrix. The user-specific application matrix may comprise the first weight values. Each one of the first weight values may be for a respective one of the first plurality of vehicle applications selected by the user of the vehicle 100. Additionally, each one of the first weight values is determined based on a frequency of use, by the user, of the respective one of the first plurality of vehicle applications.

In operation S410, the server 150 transmits to the vehicle 100 a group application matrix comprising second weight values. Although FIG. 4 shows operation S410 occurring after operation S400, operation S410 may occur before operation S400, consistent with a non-limiting embodiment. Accordingly, a group application matrix may be provided to the vehicle 100 and corresponding vehicle applications may be pre-installed without first receiving any selection of vehicle applications from the user of the vehicle 100. Each one of the second weight values may be for a respective one of a second plurality of vehicle applications. Further, each one of the second weight values may be based on a frequency of use of the respective one of the second plurality of vehicle applications by a plurality of respective vehicle users.

In operation S420, an application matrix of the vehicle 100 is updated using the group application matrix received from the server 150. For instance, according to a non-limiting embodiment, the at least one processor 101 may select vehicle applications having higher ones of the second weight values, from among the second plurality of vehicle applications, using the received group application matrix, and may update the application matrix of the vehicle 100 to include the vehicle applications having the higher second weight values.

In operation S430, the vehicle 100 may transmit to the server 150 a vehicle application list, which lists at least one application that has been selected at the vehicle 100 (e.g., from among the vehicle applications having higher ones of the second weight values), but is not currently installed in the vehicle 100. In operation S440, the vehicle application that is not currently installed in the vehicle 100 is downloaded and installed in the vehicle 100.

In the case where a vehicle 100 is used by multiple users (e.g., a private family, commercial car-sharing, bus, taxi, etc.) and a user begins using the vehicle 100, vehicle applications may be installed in the vehicle 100 via an OTA according to the user's preferences, tendencies, etc. However, if vehicle applications at the vehicle 100 are rewritten each time a new user uses the vehicle 100, then the amount of data communication (e.g., via OTA) would be large. Moreover, the time required to download and install the preferred vehicle applications would be long and the vehicle 100 could not be used immediately.

To address such issues, and others, a non-limiting embodiment may predict, download and install, in advance, the optimal vehicle applications for users. Such predictions may be calculated from data collected from a group of other users having expected similarities to the next potential user.

Also, if the server 150 manages and distributes the vehicle applications for each vehicle such that the installed vehicle applications are customized for each individual user, from an unspecified number of users, the management load on the server 150, and the resources required from the server 150, could be substantial. Thus, a non-limiting embodiment more advantageously distributes processing between the vehicle 100 and the server 150.

Embodiments of the disclosure have been shown and described above, however, the embodiments of the disclosure are not limited to the aforementioned specific embodiments. It may be understood that various modifications, substitutions, and improvements can be made by those having ordinary skill in the art in the technical field to which the disclosure belongs, without departing from the spirit of the disclosure as claimed by the appended claims. It should be understood that such modifications, substitutions, and improvements shall fall within the protection scope of the disclosure, and should not to be construed independently from the technical idea or prospect of the disclosure.

What is claimed is:

1. An apparatus for a vehicle, the apparatus comprising:
at least one storage storing instructions; and
at least one processor configured to execute the instructions to perform operations comprising:
obtaining information identifying a first plurality of vehicle applications selected by a user of the vehicle;
determining, for the user, a user-specific application matrix comprising:
a list of the first plurality of vehicle applications; and
first weight values, wherein the user-specific application matrix is configured with each one of the first weight values arranged corresponding to a respective one of the first plurality of vehicle applications, and wherein each one of the first weight values is determined based on at least a frequency of use, by the user, of the respective one of the first plurality of vehicle applications;
controlling, using the determined user-specific application matrix, downloading and installation, at the vehicle, of at least one of the first plurality of vehicle applications that is not currently installed in the vehicle;
controlling receiving, at the vehicle, from a server, a group application matrix comprising second weight values, wherein each one of the second weight values is arranged corresponding to a respective one of a second plurality of vehicle applications, and wherein each one of the second weight values is based on at least a frequency of use of the respective one of the second plurality of vehicle applications by a plurality of respective vehicle users;
determining differences between the determined user-specific application matrix and the received group application matrix; and
controlling providing the determined differences to the server without providing the entire determined user-specific application matrix.

2. The apparatus of claim 1, the operations further comprising:
controlling, using the group application matrix, downloading and installation, at the vehicle, of at least one of the second plurality vehicle applications that is not currently installed in the vehicle.

3. The apparatus of claim 2, wherein the second weight values are based on at least the frequency of use of the respective ones of the second plurality of vehicle applications by the plurality of respective vehicle users over a predetermined time period.

4. The apparatus of claim 2, wherein the plurality of respective vehicle users are vehicle users located within a predetermined region.

5. The apparatus of claim 2, wherein the plurality of respective vehicle users are users of a same vehicle model or a same vehicle type as the vehicle.

6. The apparatus of claim 2, wherein the controlling, using the group application matrix, downloading and installation, at the vehicle, of the at least one of the second plurality vehicle applications that is not currently installed in the vehicle comprises prioritizing for the downloading and installation ones of the second plurality of vehicle applications having higher respective second weight values.

7. The apparatus of claim 1, the operations further comprising:
controlling providing the determined user-specific application matrix to the server;
controlling receiving, at the vehicle, from the server, the group application matrix comprising second weight values determined using the provided user-specific application matrix; and
controlling, using the group application matrix, downloading and installation, at the vehicle, of at least one of the second plurality vehicle applications that is not currently installed in the vehicle.

8. The apparatus of claim 1, wherein the controlling, using the determined user-specific application matrix, downloading and installation, at the vehicle, of the at least one of the first plurality of vehicle applications that is not currently installed in the vehicle comprises prioritizing for the downloading and installation ones of the first plurality of vehicle applications having higher respective first weight values.

9. The apparatus of claim 1, wherein each one of the first weight values is determined based on at least a frequency of use, by the user, of the respective one of the first plurality of vehicle applications over a predetermined time period.

10. A vehicle application management server comprising:
at least one storage storing instructions; and
at least one processor configured to execute the instructions to perform operations comprising:
receiving, from a vehicle, information about a user-specific application matrix for a user of the vehicle, wherein the user-specific application matrix comprises:
a list of a first plurality of vehicle applications; and
first weight values, wherein the user-specific application matrix is configured with each one of the first weight values being arranged corresponding to a respective one of the first plurality of vehicle applications selected by the user, and wherein each one of the first weight values is determined based on at least a frequency of use, by the user, of the respective one of the first plurality of vehicle applications;
updating second weight values of a group application matrix stored in the at least one storage using the first weight values of the user-specific application matrix, wherein each one of the second weight values is arranged corresponding to a respective one of a second plurality of vehicle applications, and wherein each one of the second weight values is based on at least a frequency of use of the respective one of the second plurality of vehicle applications by a plurality of respective vehicle users;
transmitting, to the vehicle, the updated second weight values of the group application matrix;
receiving, from the vehicle, determined differences between the user-specific application matrix and the transmitted updated second weight values of the group application matrix without receiving the entire user-specific application matrix; and
receiving, from the vehicle, a request to download and install, at the vehicle, at least one of the second plurality vehicle applications, selected from the updated second weight values of the group application matrix, that is not currently installed in the vehicle.

11. The vehicle application management server of claim 10, wherein the second weight values are based on at least the frequency of use of the respective ones of the second plurality of vehicle applications by the plurality of respective vehicle users over a predetermined time period.

12. The vehicle application management server of claim 10, wherein the plurality of respective vehicle users are vehicle users located within a predetermined region.

13. The vehicle application management server of claim 10, wherein the plurality of respective vehicle users are vehicle users of a same vehicle model or a same vehicle type as the vehicle.

14. A non-transitory computer readable storage medium storing instructions which, if executed, cause a processor of a vehicle to execute operations comprising:
obtaining information identifying a first plurality of vehicle applications selected by a user of the vehicle;
determining, for the user, a user-specific application matrix comprising: a list of the first plurality of vehicle applications;
determining first weight values, wherein the user-specific application matrix is configured with each one of the first weight values arranged corresponding to a respective one of the first plurality of vehicle applications, and wherein each one of the first weight values is determined based on at least a frequency of use, by the user, of the respective one of the first plurality of vehicle applications;
controlling, using the determined user-specific application matrix, downloading and installation, at the vehicle, of at least one of the first plurality of vehicle applications that is not currently installed in the vehicle;
determining second weight values, wherein each one of the second weight values is arranged corresponding to a respective one of a second plurality of vehicle applications, wherein each one of the second weight values is based on at least a frequency of use of the respective one of the second plurality of vehicle applications by a plurality of respective vehicle users;
determining differences between the determined user-specific application matrix and a received group application matrix; and
controlling providing the determined differences to a server without providing the entire determined user-specific application matrix.

15. The non-transitory computer readable storage medium of claim 14, the operations further comprising:
controlling, using the group application matrix, downloading and installation, at the vehicle, of at least one of the second plurality vehicle applications that is not currently installed in the vehicle.

16. The non-transitory computer readable storage medium of claim 15, wherein the second weight values are based on at least the frequency of use of the respective ones of the second plurality of vehicle applications by the plurality of respective vehicle users over a predetermined time period.

17. The non-transitory computer readable storage medium of claim 15, wherein the plurality of respective vehicle users are vehicle users located within a predetermined region.

18. The non-transitory computer readable storage medium of claim 15, wherein the plurality of respective vehicle users are users of a same vehicle model or a same vehicle type as the vehicle.

19. The non-transitory computer readable storage medium of claim 15, wherein the controlling, using the group application matrix, downloading and installation, at the vehicle, of the at least one of the second plurality vehicle applications that is not currently installed in the vehicle comprises prioritizing for the downloading and installation ones of the second plurality of vehicle applications having higher respective second weight values.

20. The non-transitory computer readable storage medium of claim 14, the operations further comprising:
controlling providing the determined user-specific application matrix to the server;
controlling receiving, at the vehicle, from the server, the group application matrix comprising second weight values determined using the provided user-specific application; and
controlling, using the group application matrix, downloading and installation, at the vehicle, of at least one of the second plurality vehicle applications that is not currently installed in the vehicle.

21. The non-transitory computer readable storage medium of claim 14, wherein the controlling, using the determined user-specific application matrix, downloading and installation, at the vehicle, of the at least one of the first plurality of vehicle applications that is not currently installed in the vehicle comprises prioritizing for the downloading and installation ones of the first plurality of vehicle applications having higher respective first weight values.

22. An apparatus for a vehicle, the apparatus comprising:
at least one storage storing instructions; and
at least one processor configured to execute the instructions to perform operations comprising:
controlling receiving, at the vehicle, from a server, a group application matrix comprising:
a list of a second plurality of vehicle applications; and
second weight values, wherein the group application matrix is configured with each one of the second weight values arranged corresponding to a respective one of the second plurality of vehicle applications, and wherein each one of the second weight values is based on at least a frequency of use of the respective one of the second plurality of vehicle applications by a plurality of respective vehicle users;
determining differences between a determined user-specific application matrix and the received group application matrix;
controlling providing the determined differences to the server without providing the entire determined user-specific application matrix; and
controlling, using the group application matrix, downloading and installation, at the vehicle, of at least one of the second plurality vehicle applications that is not currently installed in the vehicle.

23. The apparatus of claim 22, wherein the controlling, using the group application matrix, downloading and installation, at the vehicle, of the at least one of the second plurality vehicle applications that is not currently installed in the vehicle comprises prioritizing for the downloading and installation ones of the second plurality of vehicle applications having higher respective second weight values.

24. The apparatus of claim 22, wherein controlling, using the determined user-specific application matrix, downloading and installation, at the vehicle, of the at least one of the first plurality of vehicle applications that is not currently installed in the vehicle comprises prioritizing for the downloading and installation ones of the first plurality of vehicle applications having higher respective first weight values.

* * * * *